(12) United States Patent
Eltzschig et al.

(10) Patent No.: US 11,914,872 B2
(45) Date of Patent: Feb. 27, 2024

(54) METHOD, COMPUTER PROGRAM, ELECTRONIC MEMORY MEDIUM AND DEVICE FOR PROVIDING A PIECE OF DATA

(71) Applicant: Robert Bosch GmbH, Stuttgart (DE)

(72) Inventors: Christian Eltzschig, Berlin (DE); Dietrich Kroenke, Berlin (DE); Mathias Kraus, Berlin (DE); Michael Poehnl, Wurmberg (DE); Steffen Koenig, Leinfelden-Echterdingen (DE); Wenwen Chen, Grafenau (DE); Lutz Bornmann, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/765,048

(22) PCT Filed: Aug. 19, 2020

(86) PCT No.: PCT/EP2020/073203
§ 371 (c)(1),
(2) Date: May 27, 2022

(87) PCT Pub. No.: WO2021/063592
PCT Pub. Date: Apr. 8, 2021

(65) Prior Publication Data
US 2022/0391112 A1    Dec. 8, 2022

(30) Foreign Application Priority Data
Oct. 4, 2019    (DE) .................... 10 2019 215 291.0

(51) Int. Cl.
*G06F 3/06* (2006.01)

(52) U.S. Cl.
CPC .......... *G06F 3/0631* (2013.01); *G06F 3/0607* (2013.01); *G06F 3/0673* (2013.01)

(58) Field of Classification Search
CPC .... G06F 3/0607; G06F 3/0631; G06F 3/0673; G06F 8/65
See application file for complete search history.

(56) References Cited

U.S. PATENT DOCUMENTS

2005/0124332 A1    6/2005    Clark et al.

OTHER PUBLICATIONS

International Search Report for PCT/EP2020/073203 dated Oct. 27, 2020.

*Primary Examiner* — Yong J Choe
(74) *Attorney, Agent, or Firm* — NORTON ROSE FULBRIGHT US LLP; Gerard A. Messina

(57) ABSTRACT

A method for providing a piece of data in a communication system. The method includes: allocating a memory means for updating data in the memory means, in particular by a producer, in particular in response to a request signal of the producer; updating the data in the provided memory means with the piece of data; providing the memory means for the purpose of being read out, in particular by a consumer, wherein, in the allocation step, the memory means is allocated as a function of a status of the memory means.

5 Claims, 2 Drawing Sheets

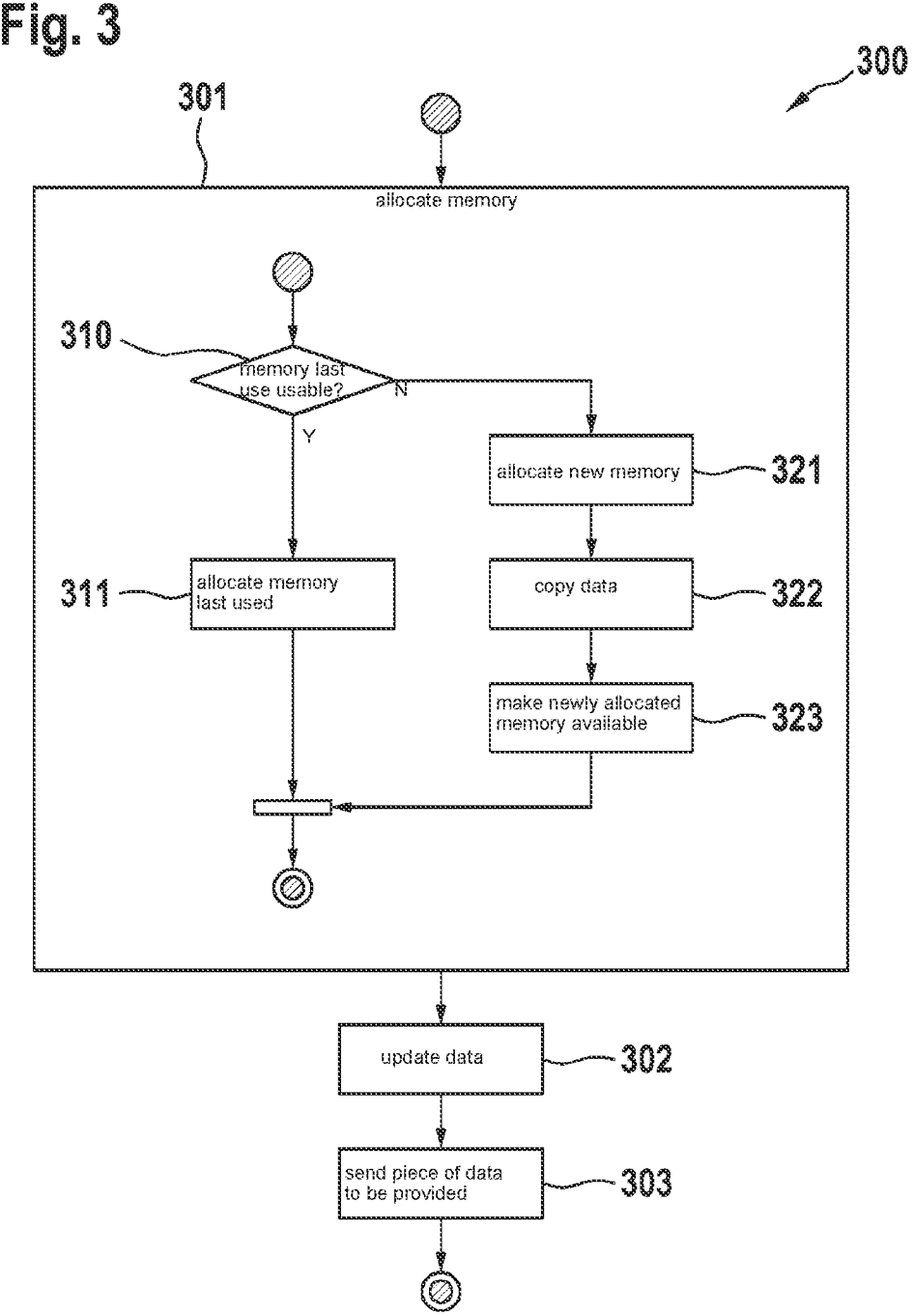

METHOD, COMPUTER PROGRAM, ELECTRONIC MEMORY MEDIUM AND DEVICE FOR PROVIDING A PIECE OF DATA

FIELD

The present invention provides a method for providing data, more generally a piece of data, in a communication system. The present invention further provides a corresponding computer program, an electronic memory medium as well as a corresponding device.

BACKGROUND INFORMATION

In systems, on which large quantities of data are processed, the copying of the data is a costly matter, i.e., a procedure which, in part, requires a large share of the available computing resources. For example, multiple gigabytes are processed per second for driver assistance or for automated driving. Valuable computing resources may therefore be saved, for example, in the form of computing time, if the copying of data is largely avoided.

On systems including multiple computing cores or different contexts of execution (e.g., different tasks on an OSEK operating system), it is conventional to use communication middleware to ensure the consistent transfer of data between concurrent portions of the applications. Users of communication middleware are producers and consumers. Producers enter data in the communication middleware; this may take place by filing data in memories managed by the middleware. Consumers use the entered data; this may take place by reading out the corresponding memory managed by the middleware.

To avoid copies, it is conventional to use a so-called "zero copy" approach, in particular for entering data. Communication middleware according to the "zero copy" approach typically proceeds in two steps. In a first step, the producer requests memory or memory means from the communication middleware. In a second step, the producer writes the data to be provided to the requested memory.

In a "zero copy" approach, the possibilities for modifying the entered data are typically lost for the producer upon the entrance of the data in the memory. Since consumers read this very instance of the data, a subsequent modification of the data would result in an undefined behavior. This is also referred to in the literature as data race.

SUMMARY

One application for a producer is a continuous processing of a data set, which is to be provided (to be sent) cyclically to one or multiple consumers. In the area of automated driving, this may be, for example, a surroundings model, which is continuously updated and is provided to one or multiple consumers every 100 milliseconds.

A continuous processing of this type requires that, upon each iteration, the last status of the data is used as a basis, and these data are further changed. This is not possible or not permitted in the common "zero copy" approaches.

In an application, in which a data set is continuously processed, and the last status in each case is used as the starting point for the change, a copying of the data therefore may not, or not always, be avoided, despite a "zero copy" approach.

The present invention provides a method for providing a piece of data in a communication system. In accordance with an example embodiment of the present invention, the method includes the following steps:
  allocating a memory means (memory) for updating the data in the memory means;
  updating the data in the allocated memory means with the piece of data;
  providing the allocated memory means including the updated data for being read out.

The method includes, in the allocation step, the memory means is allocated as a function of a status of the memory means.

The allocation step may take place in response to a request signal, which represents the request of a memory means for providing a piece of data. A signal of this type may have been output by a producer of the piece of data to be provided. The request signal could be implemented, for example, as a function call in a programming language.

A communication system may be understood in the present case as a system which includes at least one producer and one communication middleware. The producer in a communication system is a communication source, i.e., the producer generates a piece of data, which may be provided with the aid of the communication middleware. The recipient of the generated piece of data may be a consumer. A consumer is a communication sink.

Communication middleware may be understood in the present case to be an abstraction layer in a software system, which makes interfaces for providing or accepting data available to producers as well as consumers. The communication middleware typically prescinds the access to the underlying hardware layer and the hardware management.

Allocating a memory means may be understood in the present case to provide a portion of a physical memory in such a way that the allocating producer receives access to the physical memory for the purpose of entering a piece of data to be provided. The allocation typically includes not only the provision of a portion of the physical memory, but additionally ensures that no other producers or possibly consumers receive access to the allocated portion of the physical memory, so that a filing of the piece of data to be provided in the allocated memory means may take place consistently.

The method has the advantage that the allocation may take place as a function of the status of the memory means. In an application in which a data set is continuously updated by a producer, it is therefore possible to use the memory means of the previous provision and thus to build upon the data last provided and to update the latter with the piece of data to be provided without first copying the data last provided to a new memory medium to be allocated.

In an application in which a data set is continuously updated by a producer, it is thus possible under certain circumstances to avoid a copying.

According to one specific example embodiment of the method of the present invention, the memory means in the allocation step is the memory means last used.

This specific example embodiment has the advantage that, in an application in which the data last provided are continuously updated with the aid of the piece of data to be provided and are provided cyclically, a copying of the data last provided is avoided, since the allocated memory means is the memory means last used and thus already contains the data last provided.

According to one specific example embodiment of the method of the present invention, in the allocation step, the memory means last used is allocated if the status of the memory means last used indicates that the memory means is usable.

A memory means is usable if no consumer of the memory means is active or if all consumers of the memory means have processed the data presently stored in the memory means.

Whether a consumer of the memory means is active or whether all consumers of the memory means have processed the data presently stored in the memory means may be ascertained or checked with the aid of customary measures, which are used for this purpose, for example, in communication middleware.

According to one specific example embodiment of the method of the present invention, in the allocation step, a new memory means is requested, and the contents of the memory means last used is copied to the newly requested memory means if the status of the memory means last used indicates that the memory means is not usable.

A memory means is not usable if a consumer of the memory means is active or if not all consumers of the memory means have processed the data presently stored in the memory means.

A further aspect of the present invention is a computer program, which is configured to carry out all steps of the method according to the present invention.

A further aspect of the present invention is an electronic memory medium, on which the computer program according to the present invention is stored.

A further aspect of the present invention is a device or an electronic control unit, which is configured to carry out all steps of the method according to the present invention.

Specific embodiments of the present invention are explained in greater detail below on the basis of the figures.

BRIEF DESCRIPTION OF THE DRAWINGS

FIG. 3 shows a flowchart of one specific example embodiment of the method for providing a piece of data according to the present invention.

DETAILED DESCRIPTION OF EXAMPLE EMBODIMENTS

Figure 1:
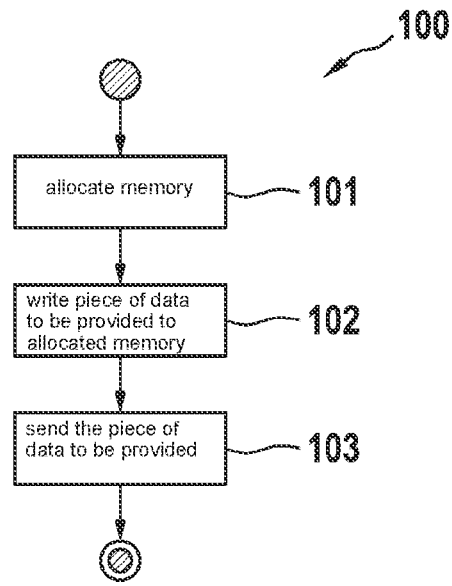
FIG. 1 shows a flowchart of a first specific embodiment of a method for providing a piece of data according to the related art.

FIG. 1 shows a flowchart of a first specific embodiment of a method for providing a piece of data according to the related art.

Method 100 represents one specific embodiment of a method for providing (sending) a piece of data according to the "zero copy" approach. Method 100 includes a step 101 of allocating a memory means. A memory means of this type may be, for example, a portion of a physical memory of a computer. It may likewise be a portion of a physical memory of an embedded computing device, such as an electronic control unit for controlling a vehicle (vehicle control unit). Allocation 101 of the memory means may take place via a so-called communication middleware.

Method 100 further includes a step 102 of writing the piece of data to be provided to the allocated memory means. In this step, the producer of the piece of data to be provided writes the piece of data to be provided to the allocated memory means. Upon writing 102, the processing rights, in particular the write rights, for the piece of data are typically transferred from the producer to the communication middleware.

Method 100 further includes a step 103 of sending the piece of data to be provided. Sending 103 takes place via the middleware, using the customary measures for sending a piece of data. These are dependent on the communication infrastructure and the communication protocols used, among other things.

Figure 2:
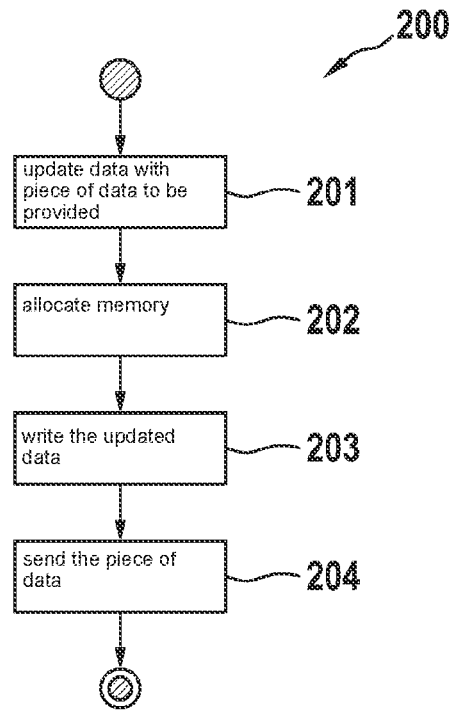
FIG. 2 shows a flowchart of a second specific embodiment of a method for providing a piece of data according to the related art.

FIG. 2 shows a flowchart of a second specific embodiment of a method 200 for providing a piece of data according to the related art.

Method 200 represents one specific embodiment of a method for providing (sending) a piece of data according to the "zero copy" approach in connection with an application, in which a producer continuously updates data (a data set) with the piece of data to be provided, and the updated data is to be provided cyclically.

An application of this type may occur, for example, in connection with automated driving, in which a surroundings model, which is continuously updated by fusing sensor data from surroundings sensors and is provided to consumers (for example, other SW components) cyclically, for example, every 100 milliseconds.

Method 200 includes a step 201 of updating data (a data set) with a piece of data to be provided. The piece of data to be provided may originate from the receipt of new sensor data from surroundings sensors. It is also possible that the piece of data to be provided is a fusion result of an upstream method for fusing sensor data of a multiplicity of surroundings sensors.

According to this specific embodiment, the updating of the data takes place at the producer of the piece of data to be provided. In other words, it takes place in the memory area managed by the producer.

Method 200 further includes a step 202 of allocating a memory means. A memory means of this type may be, for example, a portion of a physical memory of a computer. It may likewise be a portion of a physical memory of an embedded computing device, such as an electronic control unit for controlling a vehicle (vehicle control unit). Allocation 202 of the memory means may take place via a so-called communication middleware.

Method 200 further includes a step 203 of writing the updated data, including the piece of data to be provided, to the allocated memory means. In this step 203, the producer of the piece of data to be provided writes the piece of data to be provided to the allocated memory means. Upon writing 203, the write or processing rights for the piece of data are typically transferred from the producer to the middleware.

Method 200 further includes a step 204 of sending the piece of data to be provided. Sending 204 takes place via the middleware, using the customary measures for sending a piece of data. These are dependent on the communication infrastructure and the communication protocols used, among other things.

In writing step 203, in particular, it is necessary according to this specific embodiment that the entire piece of data (data set) must be written or copied to the allocated memory means. As a result, a copying may possibly occur, despite the use of a "zero copy" approach. Depending on the scope of the data set to be copied and depending on the frequency of the cyclical provision, significant consumption of computing resources may occur for the copying operation alone, in particular, in the area of automated driving.

FIG. 3 shows a flowchart of one specific example embodiment of method 300 for providing a piece of data according to the present invention.

Method 300 includes a step 301 of allocating a memory means including the piece of data last provided.

The core of the present invention is to provide this piece of data last provided, on the one hand, without copying, and on the other hand, in such a way that no consistency properties of the communication system are impaired.

For this purpose, method 300 provides, in allocation step 301, to take into account the status of the memory means last used.

For this purpose, it is initially checked in step 310 whether the memory means last used is usable.

A memory means is usable if no consumer of the memory means is active or if all consumers of the memory means have processed the data presently stored in the memory means.

If the memory means last used is usable, method 300 is continued with step 311, in which the memory means last used is allocated.

A memory means may not be usable if a consumer of the memory means is active or if not all consumers of the memory means have processed the data presently stored in the memory cell.

If the memory means last used is not usable, method 300 is continued with step 321, in which a new memory means is allocated. This memory means typically does not contain the data last provided. To provide the data updated with the piece of data to be provided with the aid of the newly allocated memory means, the data last provided are copied in step 322 from the memory means last provided to the newly allocated memory means. In step 323, the newly allocated memory means, which includes the data last provided, is made available to the requesting producer.

The request of the memory means may take place with the aid of middleware. The allocation of the memory means then takes place transparently for a producer.

Method 300 further includes a step 302 of updating the data with the piece of data to be provided in the requested memory means.

In contrast to second specific embodiment 200 of a method for providing a piece of data according to the related art, the updating of the data takes place in the memory means of the middleware. In cases in which the memory means last used is usable, it is therefore possible to update the data with the piece of data to be provided without a copying of the data.

Method 300 further includes a step 303 of sending the piece of data to be provided. Sending 303 takes place via the middleware, using the customary measures for sending a piece of data. These are dependent on the communication infrastructure and the communication protocols used, among other things.

What is claimed is:

1. A method for providing a piece of data in a communication system, comprising the following steps:
    allocating a memory for updating data in the memory, by a producer, in response to a request signal of the producer;
    updating the data in the allocated memory with the piece of data;
    providing the allocated memory for being read out by a consumer;
    wherein, in the allocation step, the memory is allocated as a function of a status of the memory;
    wherein, in the allocation step, the memory last used is allocated when the status of the memory last used indicates that the memory last used is usable, the memory last used is usable when no consumer of the memory last used is active and/or all consumers of the memory last used have processed the data of the memory.

2. The method as recited in claim 1, wherein, in the allocation step, the memory is a memory last used.

3. A method for providing a piece of data in a communication system, comprising the following steps:
    allocating a memory for updating data in the memory, by a producer, in response to a request signal of the producer;
    updating the data in the allocated memory with the piece of data;
    providing the allocated memory for being read out by a consumer;
    wherein, in the allocation step, the memory is allocated as a function of a status of the memory;
    wherein, in the allocation step, a new memory is requested, and contents of a memory last used are copied to the new memory when the status of the memory last used indicates that the memory last used is not usable, the memory last used not usable when a consumer of the memory last used is active and/or not all consumers of the memory last used have processed data of the memory last used.

4. A non-transitory machine-readable memory medium on which is stored a computer program for providing a piece of data in a communication system, the computer program, when executed by a computer, causing the computer to perform the following steps:
    allocating a memory for updating data in the memory, by a producer, in response to a request signal of the producer;
    updating the data in the allocated memory with the piece of data;
    providing the allocated memory for being read out by a consumer;
    wherein, in the allocation step, the memory is allocated as a function of a status of the memory;
    wherein, in the allocation step, the memory last used is allocated when the status of the memory last used indicates that the memory last used is usable, the memory last used is usable when no consumer of the memory last used is active and/or all consumers of the memory last used have processed the data of the memory.

5. A device configured to provide a piece of data in a communication system, the device configured to:
    allocate a memory for updating data in the memory, by a producer, in response to a request signal of the producer;
    update the data in the allocated memory with the piece of data;
    provide the allocated memory for being read out by a consumer;
    wherein, in the allocation, the memory is allocated as a function of a status of the memory;
    wherein, in the allocation step, the memory last used is allocated when the status of the memory last used indicates that the memory last used is usable, the memory last used is usable when no consumer of the memory last used is active and/or all consumers of the memory last used have processed the data of the memory.

* * * * *